Patented Oct. 25, 1932

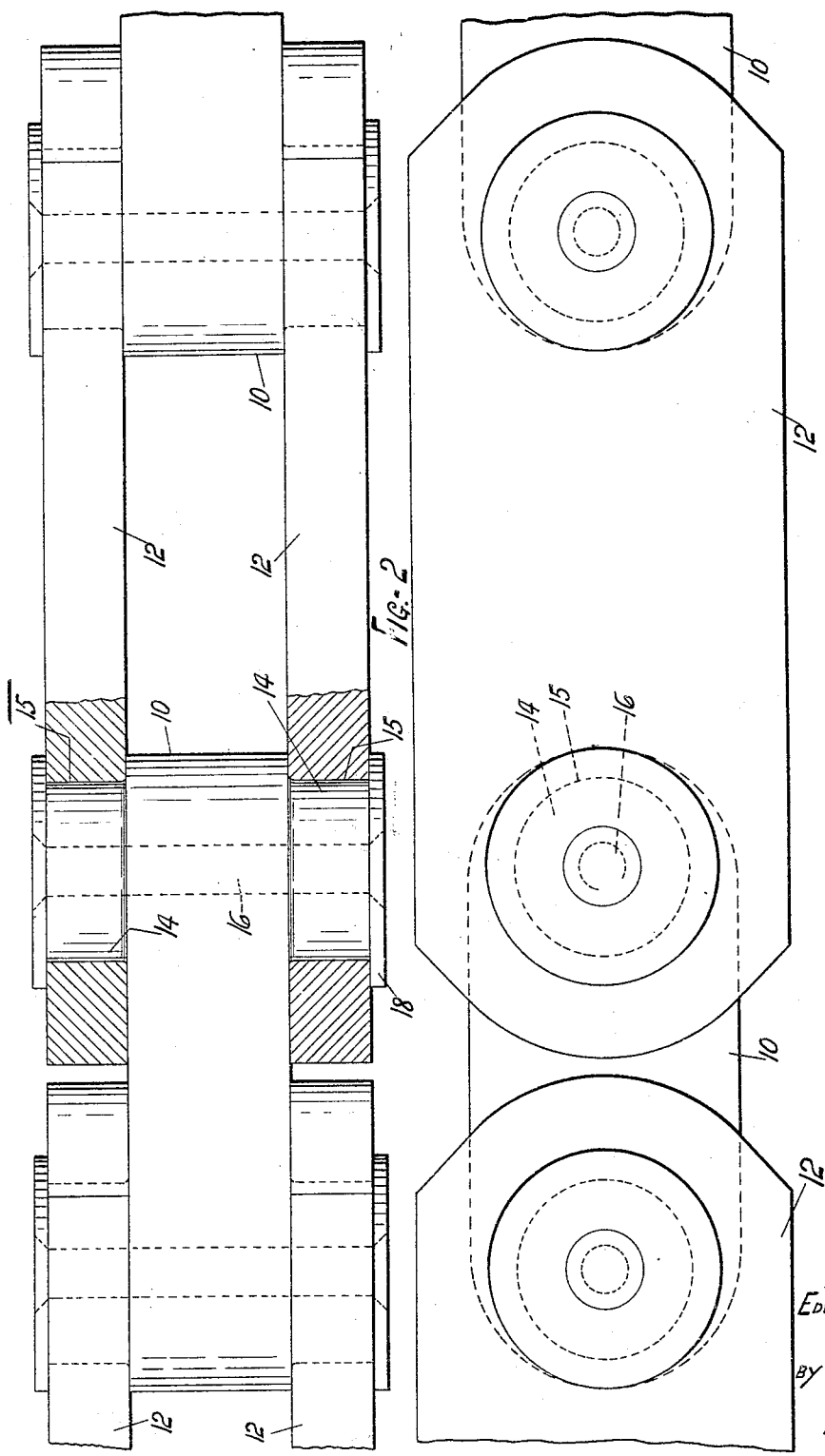

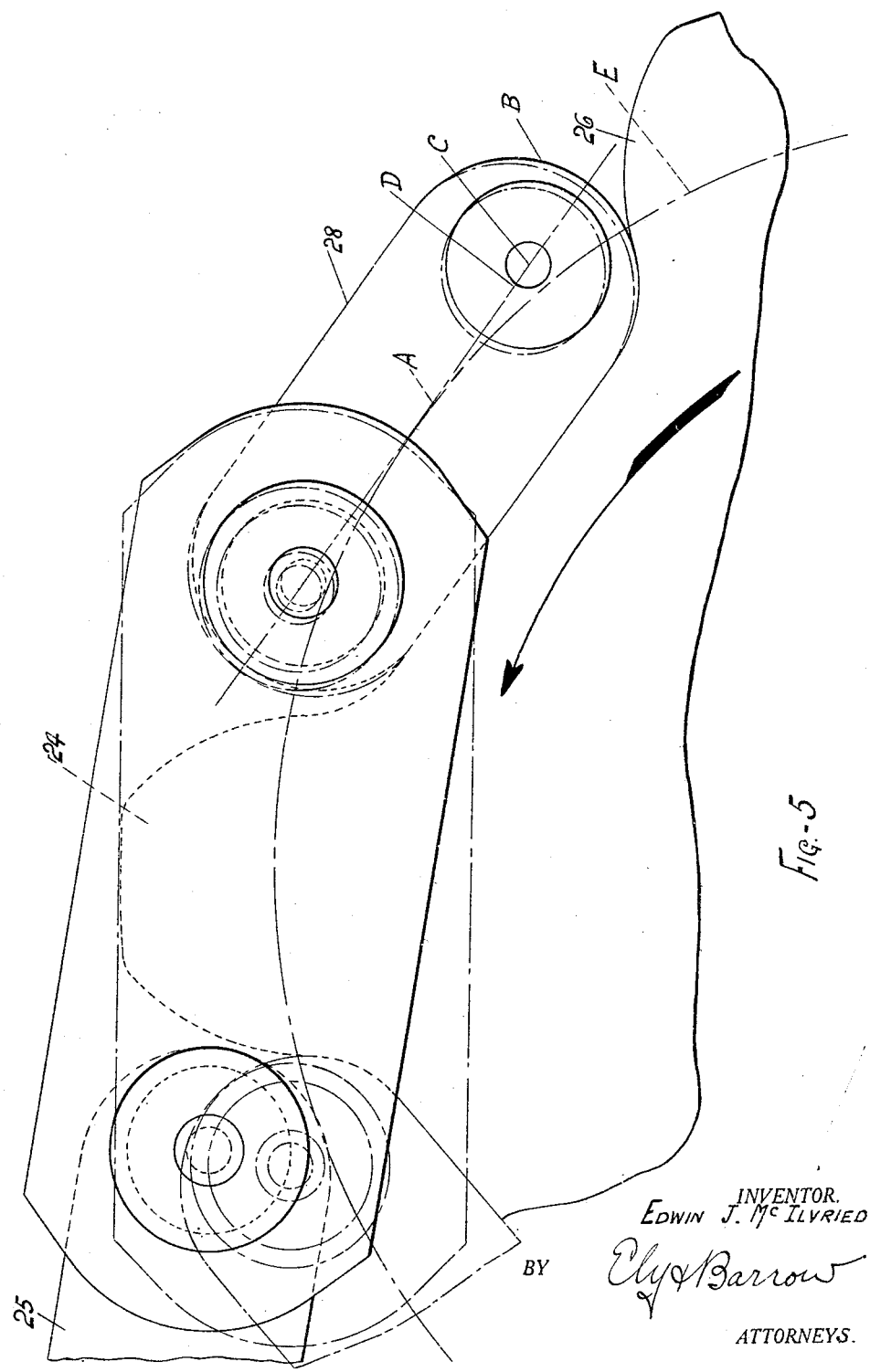

1,884,056

UNITED STATES PATENT OFFICE

EDWIN J. McILVRIED, OF CLEVELAND, OHIO, ASSIGNOR TO THE VAUGHN MACHINERY COMPANY, OF CUYAHOGA FALLS, OHIO, A CORPORATION OF OHIO

CHAIN

Application filed April 24, 1929. Serial No. 357,755.

This invention relates to the construction of chains, particularly those intended for very heavy duty, it being the object of the invention to so design the links that the strength of the chain will be greatly increased without increasing the dimensions of the links. In the construction of chains heretofore, it has been customary to drill holes through the inside and outside links, connecting the links by pins. With chains designed and intended for very heavy use, such for instance as is usual in the operation of draw bench chains, it has been necessary to increase the size of the links to provide the required metal around the pin so that it can withstand the heavy stresses placed upon it. This makes the chain very heavy for the desired strength and in addition increases the depth of the chain and thereby its pitch, and also increases the torque on the driving shaft. It is also necessary to have long center links in order to secure the proper clearance for the ends of the outside links, and with the old form of chain construction excessive bending moments are set up in the pins which reduces the life and efficiency of the chain.

One of the objects of the invention is to redesign the chain construction so as to secure the maximum strength without increasing the weight and size of the links. By the form of chain shown herein, the disadvantages in the old form of chain are obviated, and it is possible to make a chain having much greater strength than the old form of chain without increasing the size of the links. It is also one of the advantages of the invention that the separate pins are not employed and the chain construction is thereby improved.

In cases where the chain is subjected to very heavy strain and stresses, the chain will tend to cling to the sprocket and will be carried around with the sprocket. The tendency to cling to the sprocket is increased where there is any irregularity or roughness in the chain or sprocket. Instead of freeing itself the chain will wrap around the sprocket and in the case, for example, of draw benches, it is customary to provide a take off device to strip the chain at the point where it is intended to leave the sprocket.

One of the objects of the invention is to construct a chain which will automatically unload itself when it reaches the point to tangency on the delivery side of the sprocket, the chain straightening out and properly releasing the load to the preceding link still in contact with the sprocket.

These and other objects and advantages will be seen to have been accomplished by the improved chain construction which is here shown and described. It will be apparent, however, to those skilled in this art that exact conformity with the details of construction and proportion and arrangement of parts is not necessary and the essential features of the invention may be retained in modification thereof.

In the drawings in which the proposed form of the invention is shown,

Figure 1 is a side elevation of a portion of a chain structure showing the improved method of link construction.

Figure 2 is a plan thereof, the chain being broken away at one of the connecting points to show the construction thereof.

Figure 5 is a detail view showing the manner in which the chain is designed and proportioned.

Figure 3:
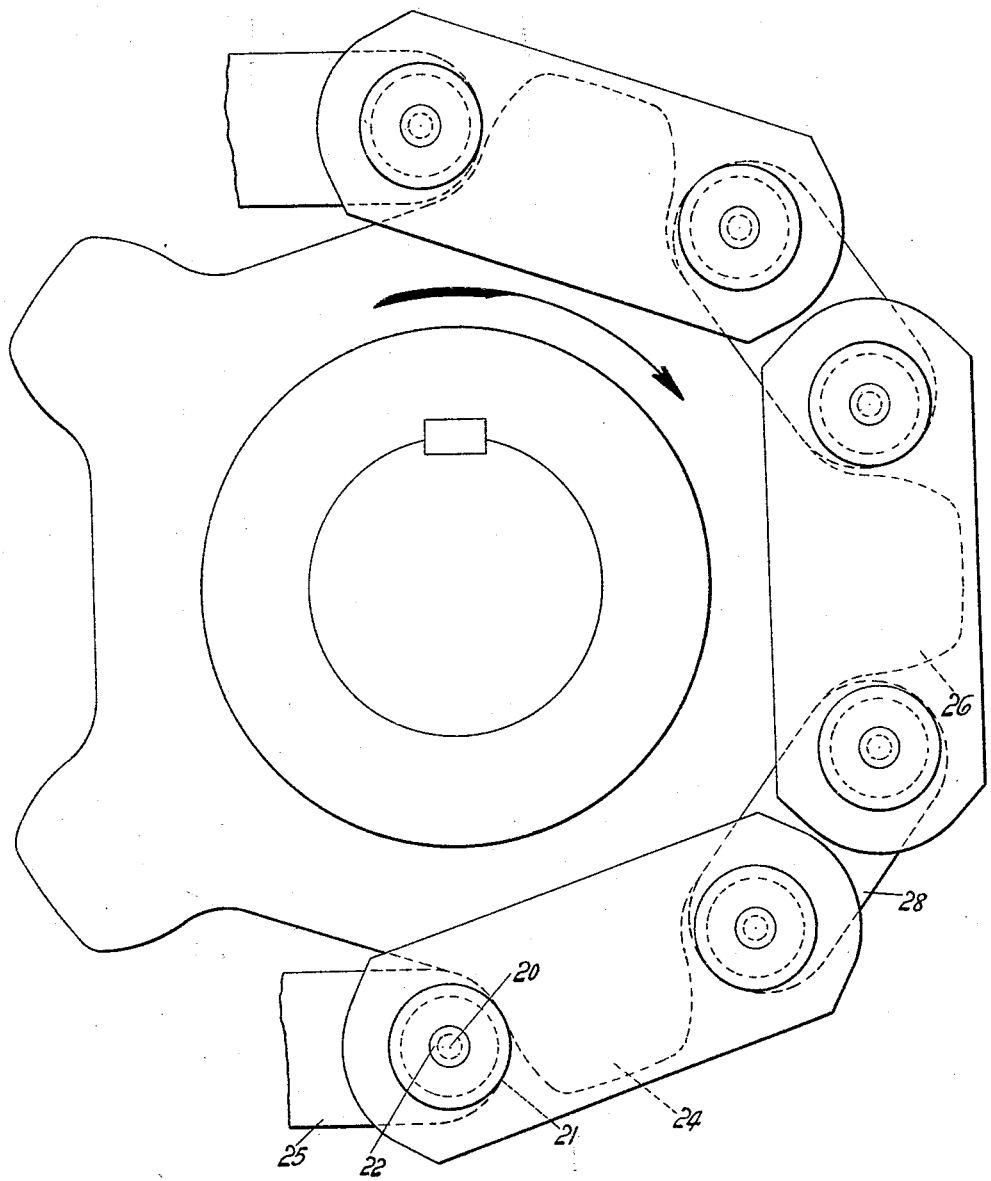
Figure 3 is a side view of a sprocket and chain showing the automatic shedding feature with one of the links about to leave the sprocket.
Figure 4:
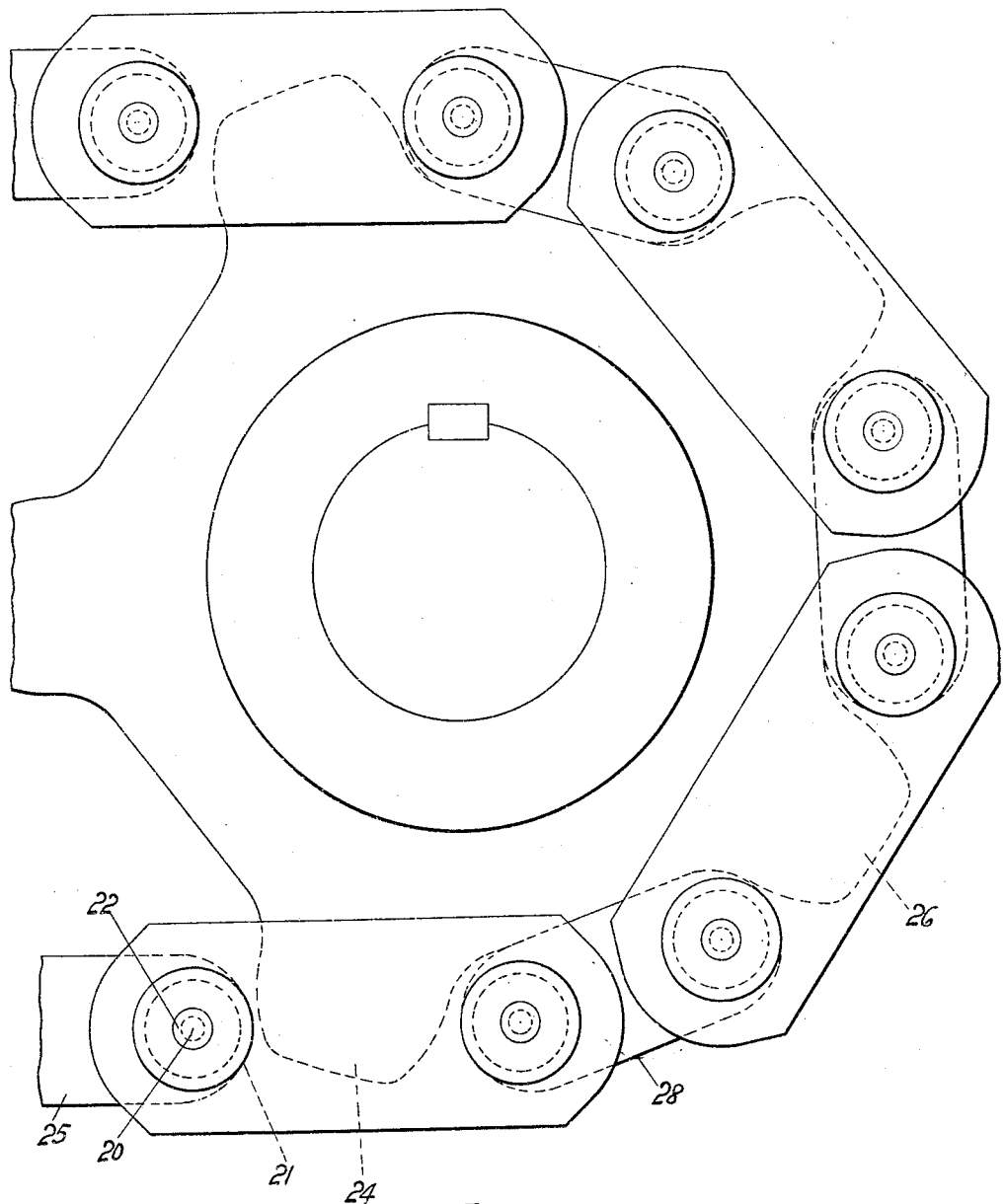
Figure 4 is a similar view showing the link freed from the sprocket.

Referring to Figures 1 and 2, the center links of the chain are indicated at 10 and the side links at 12. The center links are formed with integral circular bearing studs or bosses 14 which extend on opposite sides of the center links, being received in apertures 15 in the side links. The links are held together by pins 16 which hold washers 18 in place.

It will be observed that the usual cross pins have been dispensed with and in their places have been substituted the integral bosses or studs formed on the center links. By this construction the chain is made very strong and capable of withstanding extreme stresses, without increasing the size of the links. The various objections to the extremely heavy chains, as outlined in the opening portion of the specification, have been obviated.

In the ordinary chain construction the ends of the center links, which take the thrust or load from the teeth of the sprocket are formed on an arc concentric with the center of movement on the pivot point about which the links revolve. This tends to maintain the ends of the links in contact with the sprocket teeth during the flexing of the chain which results in the clinging of the links to the teeth, when they should free themselves at the point of tangency.

In the improved construction, the center of pivotal movement of the links is about the point 20 which is the axis of the studs or bosses 14. The end of the center links are formed on arcs or surfaces 21, the centers of which are indicated by the numeral 22.

Referring to Figure 3, the tooth 24 of the sprocket or that tooth approaching the point of tangency is in contact with the end of the center link 25 and the load is transmitted to the chain at this point. The preceding tooth 26 is out of contact with the preceding center link 28. As the link 25 moves into tangency with the sprocket, it will rock about the point 20 as a center and the surface 21 will recede from the sprocket tooth. Immediately the load will be transferred to the link 28 and the tooth 26.

The operation of the chain is shown in detail in Figure 5 in which the position of the chain as it surrounds the sprocket is shown in dot and dash lines and the position of the chain as it unloads is shown in full. The center line or line passing through the pivotal center of the center link, or that link which takes the load from the sprocket is indicated at A. The surface to which power is applied from the sprocket is indicated at B. From the point where the line A intersects the surface B, that surface recedes from the pivotal center C. This surface is preferably formed upon an arc about the point D.

As a result of this formation as the center link 28 rocks about its pivotal center C, as the chain leaves the sprocket, the surface B will be forced away from the sprocket so that the chain will free itself therefrom.

It will be noted that the chain is capable of automatically freeing itself, or unloading from the sprocket and it is therefore unnecessary to provide any stripping means for freeing the chain from the sprocket. The advantages of the improved construction are apparent to those skilled in this art.

What is claimed is:

1. A chain comprising center links and side links pivotally connected together, the end of a center link being formed on an arc, the center of which is located inwardly of the pivotal center between the links.

2. A chain comprising links pivotally connected together, the end of a link which takes the load from the sprocket being formed on an arc, the center of which is located inwardly of the pivotal center between the links.

3. In a chain construction, center links and side links, integral studs formed on the center links and received in apertures in the side links and constituting pivots about which the chain flexes and through which power is transmitted through the chain, the end of each center link being formed on an arc, the center of which is located inwardly of the center of the pivot.

4. A sprocket chain having the characteristic of automatically freeing itself from the sprocket, in which the center of the pivot for the end of a link which bears on a sprocket tooth is nearer to the end bearing surface of said link at the point where the line of link pivot centers intersects said surface than at points on opposite sides of said line.

EDWIN J. McILVRIED.